United States Patent [19]
Szakasits et al.

[11] 3,880,587
[45] Apr. 29, 1975

[54] METHOD AND APPARATUS FOR TOTAL ANALYSIS OF HYDROCARBON SAMPLES

[75] Inventors: Julius J. Szakasits, Deer Park; Alfred E. Krc, La Porte, both of Tex.

[73] Assignee: Shell Oil Company, Houston, Tex.

[22] Filed: Apr. 1, 1974

[21] Appl. No.: 457,149

[52] U.S. Cl......... 23/230 PC; 23/253 PC; 23/232 C
[51] Int. Cl..................... G01n 31/08; G01n 31/12
[58] Field of Search...... 23/230 PC, 253 PC, 232 C; 73/23.1, 61.1 CC; 55/387

[56] References Cited
UNITED STATES PATENTS

| | | | |
|---|---|---|---|
| 3,006,836 | 10/1961 | Cole | 23/232 C |
| 3,518,059 | 6/1970 | Levy | 23/253 PC X |
| 3,527,567 | 9/1970 | Philyaw et al. | 23/253 PC X |
| 3,703,355 | 11/1972 | Takahashi et al. | 23/253 PC X |

Primary Examiner—Robert M. Reese

[57] ABSTRACT

An apparatus and method for analyzing hydrocarbon samples utilizing a GLC column in combination with an oxidizing furnace and two detectors. The column is heated at a programmed rate to analyze the volatile components of the sample plus the sulphur content of the volatiles while the carbon and sulphur content of the non-volatile components are obtained by oxidizing them in the injection port and passing the oxidation products to the detectors.

7 Claims, 5 Drawing Figures

METHOD AND APPARATUS FOR TOTAL ANALYSIS OF HYDROCARBON SAMPLES

REFERENCE TO RELATED PATENT

The present invention is an improvement of the analytical distillation by gas-liquid chromatography apparatus disclosed in U.S. Pat. No. 3,527,567.

BACKGROUND OF THE INVENTION

The present invention is an improvement of the method and apparatus described in the above-referenced patent and extends the usefulness of the patented apparatus. More particularly, the patented apparatus used a thermal conductivity detector in combination with an ascarite scrubber to measure the carbon dioxide in the sample. This type of detector required that all oxygen be excluded from the sample and thus, copper oxide furnaces were used to combust the products eluted from the column before the oxidized sample could be passed to the detector. The copper oxide furnaces required regeneration at frequent intervals to maintain their performance.

Recently, the need to characterize crude oil samples has arisen in the case of spills where the person reponsible for the spill is unknown and it is desirable to determine the identity of the oil so its ownership can be traced and the person responsible for the oil spill identified. The need to specifically identify hydrocarbon samples also arises when it is necessary to distinctly characterize various hydrocarbon materials. In the past, hydrocarbon materials having substantially the same chamical composition have been impossible to identify except with very detailed mass spectrometry techniques. It is possible to identify these samples if, in addition to a carbon profile of the sample, one also had a sulphur profile of the sample. It was impossible to obtain a sulphur profile using the patented apparatus since the sulphur was removed in the copper oxide furnaces.

BRIEF SUMMARY OF THE INVENTION

The invention uses an oxidizing furnace to combust the sample eluted from the column in combination with a non-dispersive infrared detector and a flame photometer detector. Both of these detectors are relatively insensitive to oxygen and respond primarily to carbon dioxide and sulphur and sulphur compounds respectfully. This provides a complete carbon and sulphur profile of the sample and an accurate indication of the source of the sample. The use of an oxidizing furnace further eliminates the necessity of regenerating the furnace as is the case when copper oxide furnaces are used.

DESCRIPTION OF THE DRAWINGS

The present invention will be more easily understood from the following detailed description of the preferred embodiment when taken in conjunction with the attached drawings in which.

PREFERRED EMBODIMENT

Figure 1:
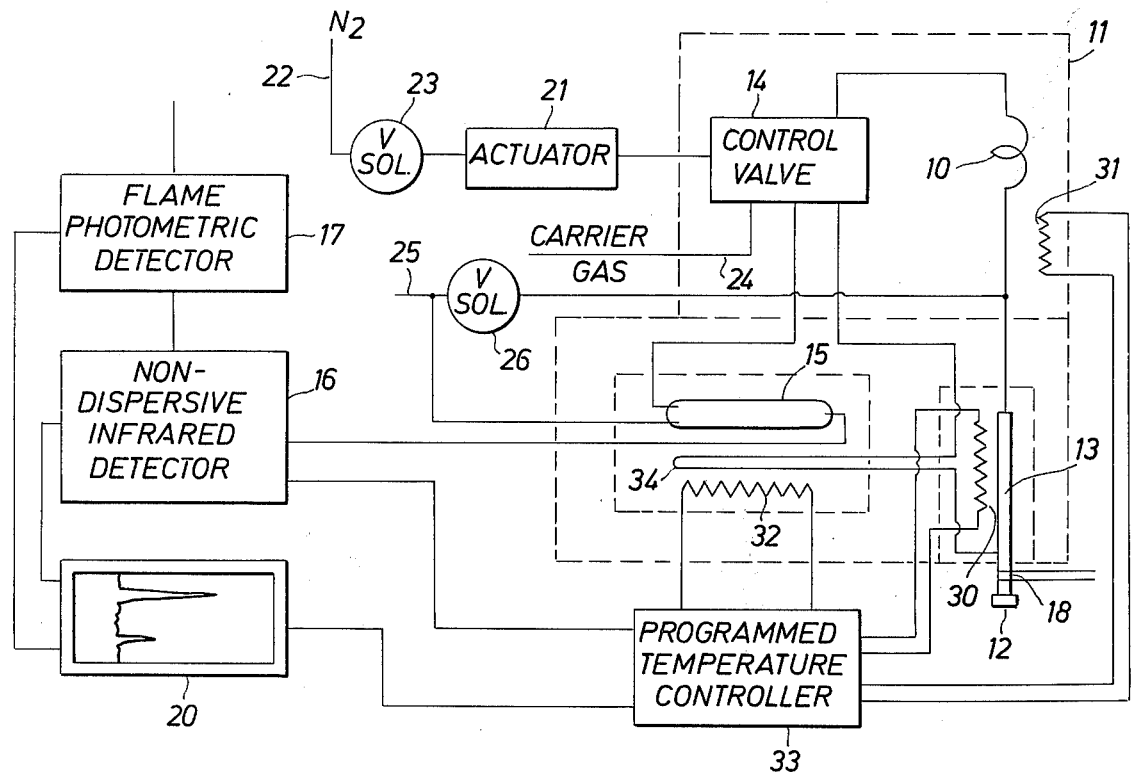
FIG. 1 is a schematic drawing of a flow path and the major components of the apparatus.

Referring to FIG. 1, there is shown in simplified form a chromatographic apparatus similar to that described in the above-referenced patent. In addition to the equipment shown in the patent, the detector has been replaced by a pair of detectors that are relatively insensitive to oxygen and an oxidizing furnace is used instead of a copper oxide furnace. The chromatographic column 10 is disposed in a heated furnace 11 with the outlet of the column connected to the control valve 14 while the inlet is connected to the injection port 13. The injection port 13 is provided with a conventional septum 12 so that samples may be injected into the port 13. A cooling means 18 surrounds the injection port to prevent damage to the septum 12 from the high temperatures during backflush. The injection port 13 is disposed in a furnace having a heating element 30. As disclosed in the patent, the purpose of the heating element 30 is to flash the volatile material from the sample and permit it to be transported into the column by means of the carrier gas supplied by line 24 to the control valve 14.

The control valve 14 is positioned by an actuator 21 to control the flow of carrier gas and thus the forward or reverse flow through the column. The actuator is operated by a suitable pressurized gas, for example, nitrogen supplied from the line 22 through a solenoid valve 23. The control valve controls the flow of the material from the column through the furnace 15 where the material is oxidized by the oxygen supplied continuously from the source 25. The temperature of the furnace 15 is maintained by a heating element 32 controlled by the programmer control 33. The temperature of the furnace should be sufficiently high, for example, 900°–950°C to oxidize all of the material eluted from the column. After the material is oxidized, it is passed to a non-dispersive infrared detector 16 which responds primarily to carbon dioxide with only a small response to other materials while the signal from the infrared detector is recorded on one pen of the dual pen recorder 20. After passing through the infrared detector, the material passes through the flame photometric detector 17 which responds primarily to the sulphur and sulphur compounds in the eluted material with the signal from the photometric detector being recorded on the second pen of the recorder 20. Thus, the chart record will display a record of both the carbon profile as well as the sulhpur profile of the sample.

The programmed temperature controller 33 which is described in more detail below with reference to FIG. 3 controls the heating elements 30, 31 and 32. These heating elements, in turn, control the temperature of the injection port 13, the temperature of the column 10 and the temperature of the two furnace elements 15 and 34. The latter furnace element 34 is used to oxidize the residual material remaining in the column and the injection port after the volatiles have passed through the column. The residual material is obtained by backflushing the column 10 while injecting oxygen into the inlet side of the column. The flow of oxygen during backflush is controlled by the solenoid valve 26. Thus, oxygen will be added to the material before it passes through the furnace 34 where it will be oxidized. By recovering the residual or non-volatile materials, a substantially complete analysis of the carbon content of the sample will be obtained.

Figure 2:
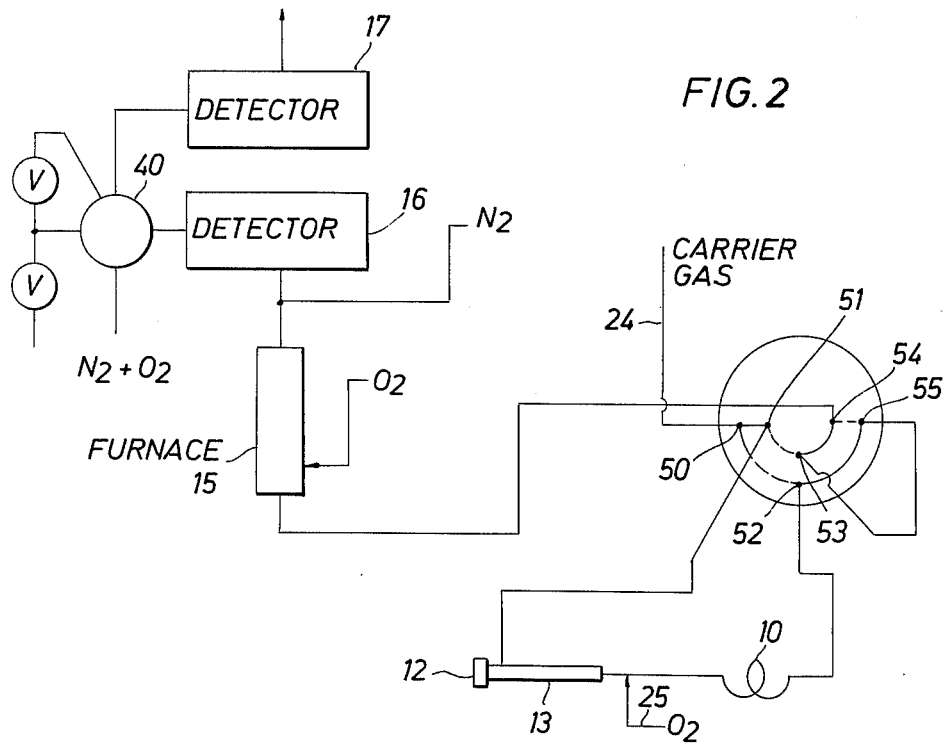
FIG. 2 is a flow diagram showing the control valve which controls the forward flow through the column and then the backflushing of the column.

Referring now to FIG. 2, there is shown the flow path through the column in both a forward direction and backflush direction. More particularly, the valve 14 is shown schematically with its various ports 50, 51, 52, 53, 54 and 55. As shown, the valve is positioned to connect carrier gas to the inlet port 13 to transport the volatiles evaporated from the sample through the column 10. After flowing through the column, the volatiles flow through additional ports in the valve to the furnace 15 where the continuous flow of oxygen will combust the carbon to form carbon dioxide. After the oxidized effluent passes from the furnace 15 it flows through the infrared detector 16 that measures the carbon content and the measurement is recorded by one pen of the recorder 20. After passing through the infrared detector, the sample passes through a diverting valve 40. The diverting valve 40 may vent a portion of the sample to the atmosphere as well as dilute the sample with additional nitrogen and oxygen. This may be necessary since the photometric detector 17 is much more sensitive than the infrared detector and can possibly be overloaded by samples which contain large amounts of sulphur.

When the column is to be backflushed, the valve 14 is positioned so that port 50 is connected to the port 52 which causes the carrier gas to flow backward or backflush the column 10. At the same time the oxygen is introduced from the line 25 by opening the solenoid valve 26 and the material flows backward through the inlet port 13 to the combustion tube 34 where it is oxidized. The oxidized material then flows through the port 51 which is coupled to the port 53 which in turn is coupled to the port 55 that is connected to the furnace 15 shown in FIG. 1.

Figure 3:
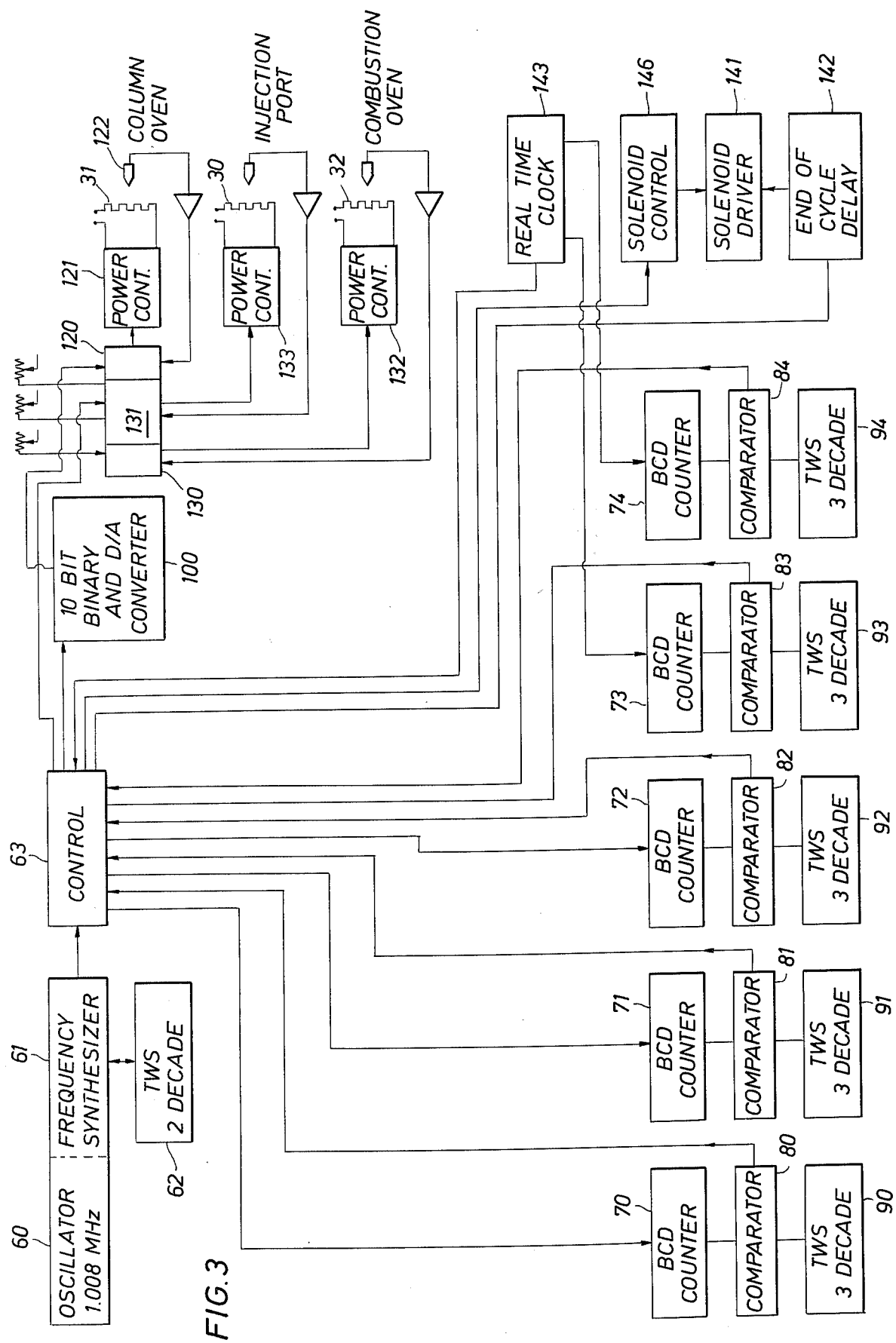
FIG. 3 is a block diagram of the programmable temperature control used in the system.

The programmed temperature controller is shown in block diagram form in FIG. 3. While a digital system is shown, a series of cam operated switches could also be used to control the system. The temperature controller utilizes an oscillator 60 for generating a fixed frequency which is then modified by a frequency synthesizer circuit 61. The synthesizer circuit responds to a setting from a 2-decade thumbwheel switch 62 to generate a selected frequency. Thus, by varying the frequency of the input signal to the controller 63, the overall timing of the individual steps of the complete cycle can be lengthened or shortened as desired.

The selected frequency is supplied to a 10-bit binary counter and digital-to-analog converter 100 plus a series of binary coded counters 70-74. The binary counters 70-74 control the timing of the valve openings and the delay periods in the system. The binary counter and digital-to-analog converter 100 generates a ramp voltage used to control the rate of heating of the column furnace. Each of the binary counters 70-74 is coupled to a comparator circuit 80-84, with each comparator circuit being coupled to a series of manually settable 3-decade devices 90-94. Thus, each comparator may be supplied with a manually set input which then controls the time delay for each binary counter-comparator circuit.

The ramp voltage from the D/A converter 100 is used as a set point for the controller 120 that controls the power supply 121 of the column heater 31. The thermocouple 122 supplies a temperature signal to the controller for comparing with the ramp voltage. In a similar manner, the controllers 130 and 131 control the power supplies 132 and 133 of the combustion over heater 32 and the injection port heater 30. Since the combustion oven is maintained at a constant temperature, the controller can utilize a fixed set point as a control input. The injection port is maintained at a first temperature and then raised to a second higher temperature and requires two different set points that are selected by the control 63.

A solenoid control 146 and solenoid driver 141 is used in positioning the solenoid 23 for positioning the control valve 14. Also, a real time clock 143 is used to reset all the circuit after the completion of a complete cycle.

Figure 4:
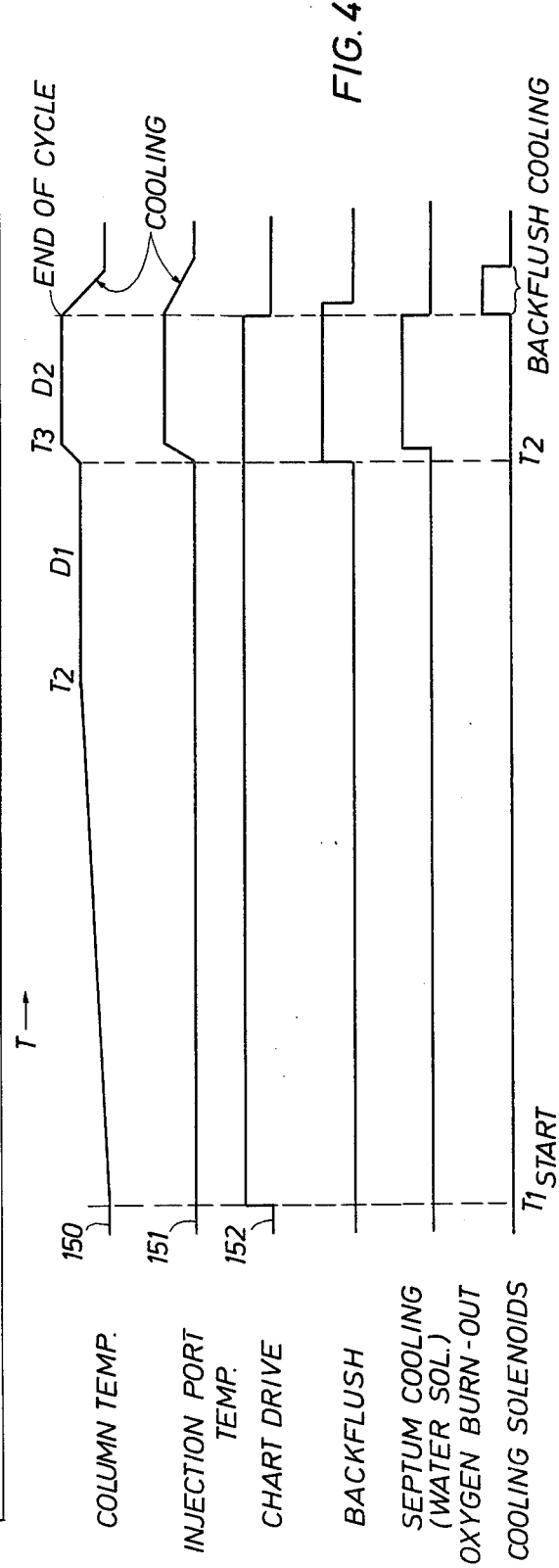
FIG. 4 is a timing diagram showing the operation of the system.

The operation of the system can be more easily understood by referring to the timing diagram of FIG. 4. As shown in the diagram at the start position, the column temperature is raised in response to the ramp voltage and the injection port temperature is raised to its initial value. The initial injection port temperature should be high enough to flash all of the volatile material from the sample and will vary for different materials. A normal range would be from 200° to 325°C. The initial column temperature should be approximately 0°C and raised at a rate of 3° to 6°C per minute to a final temperature of about 300°C at the time $T_2$. The column is held at the final temperature for a period indicated as $D_1$ that may vary between 10 and 20 minutes. At the same time that the injection port and column heating is started, the chart drive is turned on by a signal 152.

After the delay period $D_1$, the column temperature and injection port temperature are raised to a final temperature $T_3$ and the control valve 14 is positioned to backflush the column. At the same time the oxygen is turned on to the injection port by opening solenoid valve 26 and after a slight delay, for example 5 seconds. This will remove the residue from the column plus the non-volatiles from the injection port and oxidize the backflushed material. Backflushing will insure 100 percent recovery of all carbon and sulphur in the sample. The backflushed material flows from the injection port through valve 14 to the furnace 15 and the detectors 16 and 17. After the column and injection port have reached the temperature $T_3$, they are held at this temperature for a time $D_2$. The time $D_2$ may vary although 20-30 minutes have been found sufficient for raising the temperature and backflushing all the material. After all the material has been backflushed, the cooling cycle is initiated and the apparatus cooled to the original condition.

Figure 5:
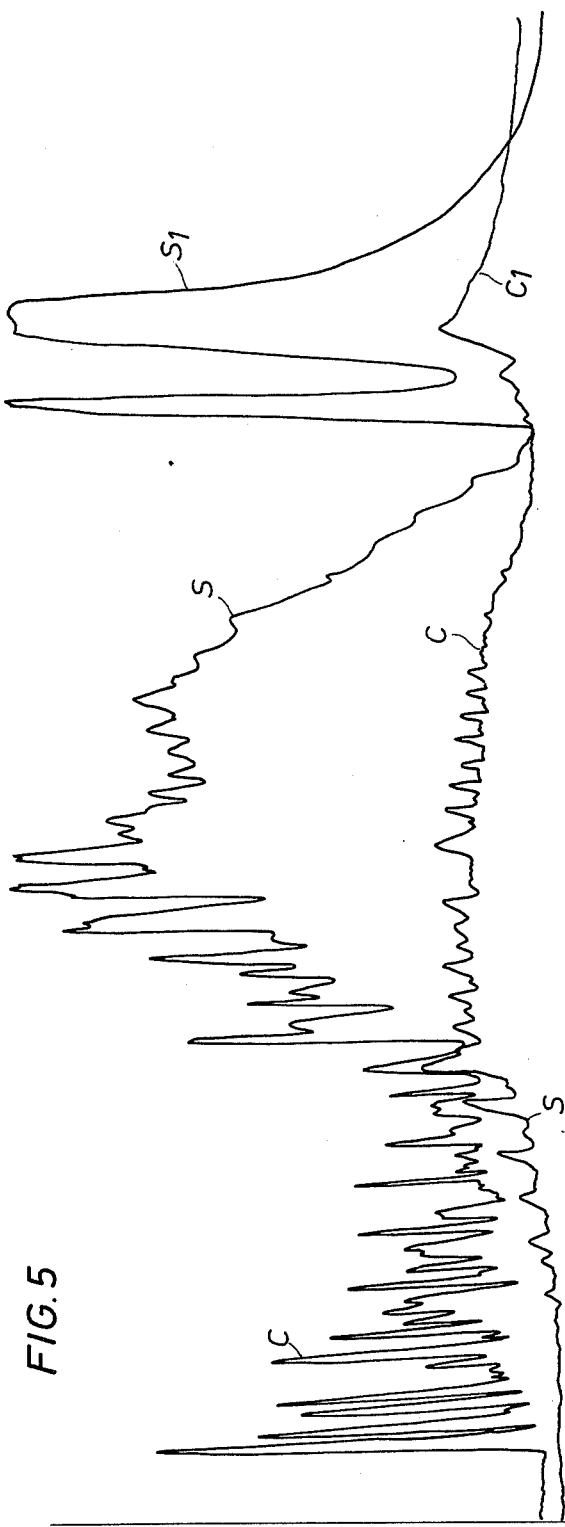
FIG. 5 is a recording of a West Texas crude.

A typical recording of a West Texas crude sample is shown in FIG. 5. The curve C represents the carbon content of the sample while the curve S represents the sulphur content. The base line of the recording is correlatible with temperature while the portion of the curves $C_1$ and $S_1$ to the right of time $T_2$ represent the material obtained when the column and injection port are backflushed. The initial temperature at time $T_1$ was 0°C while the temperature at $T_2$ was 300°C. The temperature was increased at a constant rate of 4°C per minute and the temperature for any peak can be determined after calibrating the system. This can be done by injecting a standard sample containing the range of compounds having from 5 to 42 carbon atoms. After the column was held at 300°C for 20 minutes it was backflushed and its temperature increased to 310°C. At the same time, the injection port temperature was increased to 700°C and held for 25 minutes until backflushing was completed.

While specific times and temperatures are given in the above example, these will vary for different hydrocarbons. The material used in packing the column will control the maximum column temperature that can be used. In a similar manner, the highest number of carbon atoms per molecule will determine the final temperature one should use. In the case of crude, the column temperature will limit the separation and the higher carbon number molecules must be recovered as part of the residue and oxidized in the injection port.

The recovery of the complete sample by backflushing, oxidizing the residue and recording both the carbon and sulphur content of the sample provides a means for determining the weathering of a sample. This is important when one attempts to determine the origin of a sample that has been weathered by exposure to the atmosphere. Exposure to the atmosphere will remove the light ends from the hydrocarbon and provide a sample having an exaggerated amount of heavy ends in relation to the overall sample.

We claim as our invention:

1. A GLC apparatus for analyzing a hydrocarbon sample for volatile, non-volatile and sulfur components, comprising:
    a GLC column having an injection port, outlet and valve means for controlling the flow of sample and carrier gas through said column;
    a first heater means disposed to heat said column;
    a second heater means disposed to heat said injection port;
    a furnace coupled to said outlet of said column by means of said valve means and disposed to oxidize the material eluted from said column;
    a backflush furnace coupled to the injection port of said column by said valve means and disposed to oxidize the material eluted from the column and material remaining in the injection port when the forward flow through the column is reversed;
    a source of oxygen, said source being disposed to be supplied continuously to said furnace and to said injection port when the flow through said column is reversed;
    a non-dispersive infrared detector having an inlet and discharge, both said furnace and backflush furnace being coupled to the inlet of said infrared detector; and
    a flame photometric detector having an inlet and discharge, the discharge of said infrared detector being coupled to the inlet of said flame photometric detector.

2. The apparatus of claim 1 and in addition a controller, said controller being coupled to said first and second heaters, said furnace and backflush furnace and said valve means to control the operation of said apparatus.

3. The apparatus of claim 2 wherein the cycle of said controller may be varied to vary the operating conditions of said apparatus.

4. The apparatus of claim 2 wherein said controller comprises a plurality of digital counters and a source of pulses, all of said counters being coupled to said source of pulses, said counters producing an output signal when a preset count is accumulated, said output signal being used to control the operation of the apparatus.

5. A method for analyzing a wide boiling point range sample to distinguish it from all other samples comprising:
    heating the sample to at least 300°C to remove the volatiles from the sample;
    passing the volatilized material through a GLC column;
    oxidizing the effluent from the GLC column;
    measuring the carbon content of the oxidized sample and recording the measurement with respect to time;
    measuring the sulphur content of the oxidized sample and separately recording the measurement;
    backflushing the GLC column to remove the remaining volatiles and non-volatilized material from the column and injection port;
    increasing the injection port temperature to 700°C and adding oxygen during the backflushing to oxidize the removed non-volatilized material;
    heating the volatiles and non-volatiles removed by backflushing to at least 930°C to oxidize the heated sample; and
    repeating the carbon and sulphur measuring steps.

6. The method of claim 5 wherein the recording of the carbon and sulphur content are displayed on single set of coordinates.

7. A method for determining the weathering of a hydrocarbon sample utilizing the method of claim 6 by first measuring the carbon and sulphur content of an unweathered sample of the hydrocarbon and second, measuring the carbon and sulphur content of the weathered sample and then comparing the measurements to determine the amount of hydrocarbon lost as a result of weathering.

* * * * *